(12) United States Patent
Hachisuka

(10) Patent No.: US 11,818,470 B2
(45) Date of Patent: Nov. 14, 2023

(54) IMAGE GENERATION DEVICE, IMAGE GENERATION METHOD, AND VEHICLE CONTROL SYSTEM

(71) Applicant: TOYOTA JIDOSHA KABUSHIKI KAISHA, Toyota (JP)

(72) Inventor: Motoaki Hachisuka, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/863,844

(22) Filed: Jul. 13, 2022

(65) Prior Publication Data
US 2023/0029982 A1    Feb. 2, 2023

(30) Foreign Application Priority Data

Jul. 29, 2021    (JP) .................................. 2021-124652

(51) Int. Cl.
*H04N 23/84* (2023.01)
*H04N 23/11* (2023.01)
*H05B 47/11* (2020.01)

(52) U.S. Cl.
CPC ........... *H04N 23/843* (2023.01); *H04N 23/11* (2023.01); *H05B 47/11* (2020.01)

(58) Field of Classification Search
CPC .... H04N 23/843; H04N 23/11; H04N 25/131; H04N 23/12; H05B 47/11
See application file for complete search history.

(56) References Cited

U.S. PATENT DOCUMENTS

| | | | |
|---|---|---|---|
| 10,136,110 B2 * | 11/2018 | Jung | H04N 23/80 |
| 11,451,740 B1 * | 9/2022 | Wang | G06T 5/009 |
| 11,457,160 B2 * | 9/2022 | Seok | H04N 23/11 |
| 2007/0153099 A1 | 7/2007 | Ohki et al. | |
| 2013/0113988 A1 * | 5/2013 | Wajs | H04N 23/73 348/362 |
| 2015/0085137 A1 * | 3/2015 | Wajs | H04N 23/73 348/222.1 |
| 2016/0073067 A1 * | 3/2016 | Jones | H04N 25/11 348/216.1 |
| 2022/0230455 A1 * | 7/2022 | Popovic | G06V 20/59 |
| 2023/0043815 A1 * | 2/2023 | Chen | H04N 23/951 |

FOREIGN PATENT DOCUMENTS

JP    2007-174277 A    7/2007

* cited by examiner

*Primary Examiner* — Chiawei Chen
(74) *Attorney, Agent, or Firm* — Dinsmore & Shohl LLP

(57) ABSTRACT

An image generation device acquires first received light data and second received light data from an image sensor. The image sensor receives invisible light and visible light separately through a filter. The first received light data indicates the received light result of the invisible light. The second received light data indicates the received light result of the visible light. In addition, the image generation device generates an image by performing demosaicing for at least one of the first received light data and the second received light data based on illuminance information. The illuminance information indicates the illuminance of the surrounding environment of the image sensor. When the illuminance is less than a first threshold value, the image generation device generates an invisible light image by performing first demosaicing for the first received light data without performing second demosaicing for the second received light data.

10 Claims, 5 Drawing Sheets

IMAGE GENERATION DEVICE, IMAGE GENERATION METHOD, AND VEHICLE CONTROL SYSTEM

CROSS-REFERENCE TO RELATED APPLICATION

This application claims priority to Japanese Patent Application No. 2021-124652 filed on Jul. 29, 2021, incorporated herein by reference in its entirety.

BACKGROUND

1. Technical Field

The present disclosure relates to an image generation technique that can flexibly generate a visible light image and an invisible light image.

2. Description of Related Art

Japanese Unexamined Patent Application Publication No. 2007-174277 (JP 2007-174277 A) discloses an image signal processing device that has a single-plate image sensor. The single-plate image sensor includes specific-wavelength region signal acquisition elements that acquire visible light region signals such as RGB signals and wide-wavelength region signal acquisition elements that acquire optical signals including visible light and infrared light components. The image signal processing device generates a demosaiced image, which corresponds to the wide-wavelength region signals, as brightness signals. In addition, the image signal processing device generates color difference signals based on a demosaiced image corresponding to the visible light region signals.

SUMMARY

An image photographed by a camera is sometimes used, for example, for vehicle control and city monitoring. In a dark environment where the amount of visible light is small, an invisible light image such as a near infrared image is also useful. Therefore, it is thought that a camera capable of acquiring both a normal visible light image and an invisible light image, such as a near infrared image, is useful. However, generating both a visible light image and an invisible light image means an increase in the amount of demosaicing since both images are generated. Performing demosaicing more than necessary and generating images more than necessary lead to a waste of computational resources and storage resources and to an increase in the processing time.

One of the objects of the present disclosure is to provide a technique makes it possible to flexibly generate a visible light image and an invisible light image according to the situation without performing demosaicing more than necessary.

A first aspect relates to an image generation device that generates an image. The image generation device includes one or more processors. Each of the one or more processors is configured to acquire first received light data and second received light data from an image sensor. The image sensor receives invisible light and visible light separately through a filter. The first received light data indicates the received light result of the invisible light. The second received light data indicates the received light result of the visible light. In addition, each of the one or more processors is configured to generate the image by performing demosaicing for at least one of the first received light data and the second received light data based on illuminance information. The illuminance information indicates the illuminance of the surrounding environment of the image sensor. When the illuminance is less than a first threshold value, each of the one or more processors is configured to generate an invisible light image as the image by performing first demosaicing for the first received light data without performing second demosaicing for the second received light data.

A second aspect relates to an image generation device that generates an image. The image generation device includes one or more processors. Each of the one or more processors is configured to acquire first received light data and second received light data from an image sensor. The image sensor receives invisible light and visible light separately through a filter. The first received light data indicates the received light result of the invisible light. The second received light data indicates the received light result of the visible light. In addition, each of the one or more processors is configured to generate the image by performing demosaicing for at least one of the first received light data and the second received light data based on illuminance information. The illuminance information indicates the illuminance of the surrounding environment of the image sensor. When the illuminance is equal to or greater than a threshold value, each of the one or more processors may be configured to generate a visible light image as the image by performing second demosaicing for the second received light data without performing first demosaicing for the first received light data.

A third aspect relates to a vehicle control system. The vehicle control system includes the image generation device according to the first or second aspect described above and a control device configured to control a vehicle based on the generated image.

A fourth aspect relates to an image generation method. The image generation method includes acquiring processing and development processing. The acquiring processing acquires first received light data and second received light data using an image sensor. The image sensor receives invisible light and visible light separately through a filter. The first received light data indicates the received light result of the invisible light. The second received light data indicates the received light result of the visible light. The development processing generates an image by performing demosaicing for at least one of the first received light data and the second received light data based on illuminance information. The illuminance information indicates the illuminance of the surrounding environment of the image sensor. When the illuminance is less than a first threshold value, the development processing includes processing for generating an invisible light image as the image by performing first mosaicking for the first received light data without performing second demosaicing for the second received light data.

A fifth aspect relates to an image generation method. The image generation method includes acquiring processing and development processing. The acquiring processing acquires first received light data and second received light data using an image sensor. The image sensor receives invisible light and visible light separately through a filter. The first received light data indicates the received light result of the invisible light. The second received light data indicates the received light result of the visible light. The development processing generates an image by performing demosaicing for at least one of the first received light data and the second received light data based on illuminance information. The illuminance information indicates the illuminance of the surrounding environment of the image sensor. When the illuminance is equal to or greater than a threshold value, the development processing may include processing for generating a visible light image as the image by performing second mosaicking for the second received light data without performing first demosaicing for the first received light data.

According to the present disclosure, the first demosaicing and/or the second demosaicing that are necessary are performed in consideration of the illuminance of the surrounding environment of the image sensor. That is, the visible light image and the invisible light image can be flexibly generated according to the situation without performing demosaicing more than necessary. As a result, the waste of computational resources and storage resources is prevented and, therefore, computational resources and storage resources are used efficiently. In addition, the processing time as a whole is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described with reference to the attached drawings.

1. Outline of Image Generation Device

An image generation device 1 according to this embodiment generates an image. For example, the image generation device 1 is a camera mounted on a moving object such as a vehicle or a robot. The image generation device 1 (camera) photographs the surroundings of the moving object and generates an image showing the surroundings. The generated images are used for controlling the moving object (such as autonomous travelling control, remote control). As another example, the image generation device 1 is a camera installed in a city such as a smart city. The generated images are used, for example, for monitoring the city.

In the description below, "visible light" is light in the visible region, and "invisible light" is light in at least a part of the wavelength region other than the visible region (invisible region). For example, invisible light is near infrared light. A "visible light image IMG_VI" is an image generated by capturing using visible light. On the other hand, an "invisible light image IMG_IR" is an image generated by capturing using invisible light that is not visible light. For example, when the invisible light is near infrared light, the invisible light image IMG_IR is a near infrared image.

As described below, the image generation device 1 according to this embodiment is configured to be able to flexibly generate the visible light image IMG_VI and the invisible light image IMG_IR according to the situation.

Figure 1:
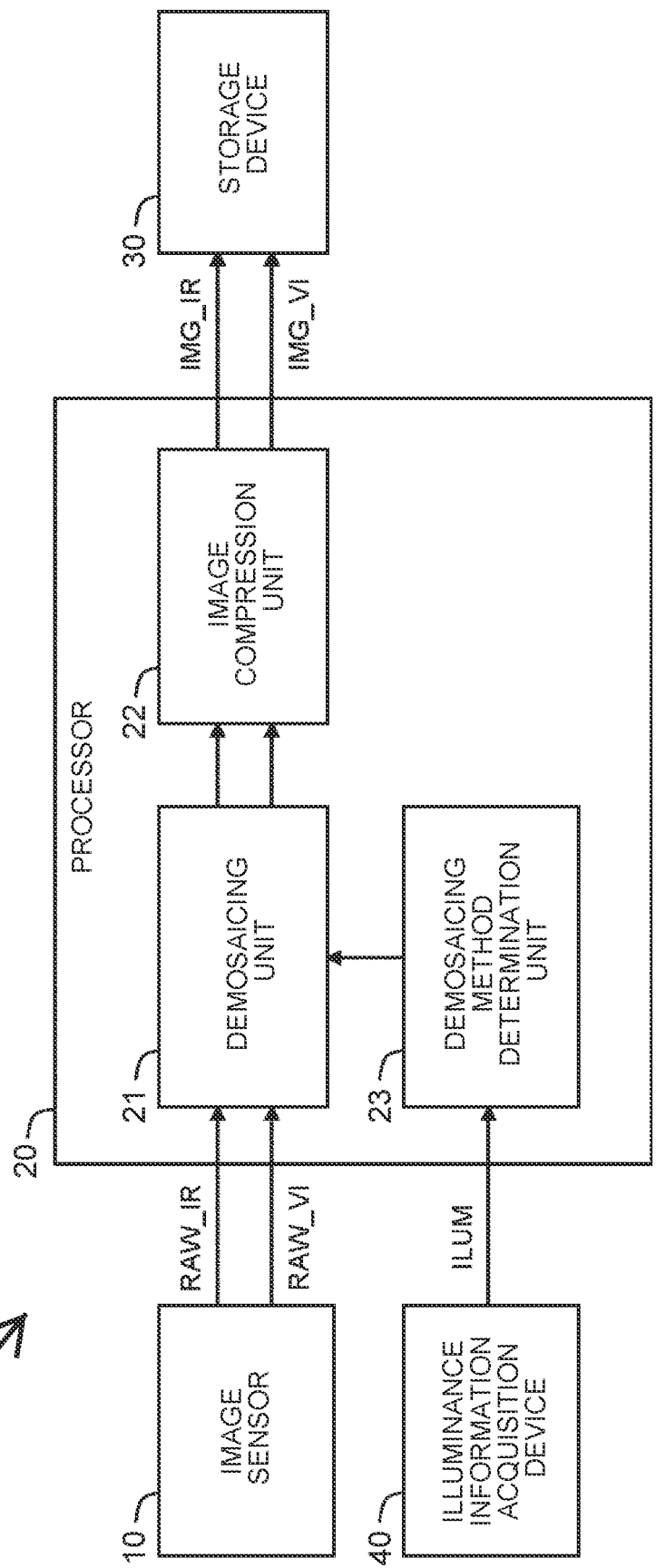
FIG. 1 is a block diagram showing a configuration example of an image generation device according to an embodiment of the present disclosure.

FIG. 1 is a block diagram showing a configuration example of the image generation device 1 according to this embodiment. The image generation device 1 includes an image sensor 10, one or more processors 20 (hereinafter, simply referred to as "processor 20"), and a storage device 30. The image sensor 10, the processor 20, and the storage device 30 may be integrated in a single device or may be distributed in a plurality of devices.

The image sensor 10 receives invisible light and visible light separately through a filter. The image sensor 10 acquires "first received light data RAW_IR" indicating the received light result of the invisible light and the "second received light data RAW_VI" indicating the received light result of the visible light. The image sensor 10 outputs the acquired first received light data RAW_IR and the second received light data RAW_VI to the processor 20.

Figure 2:
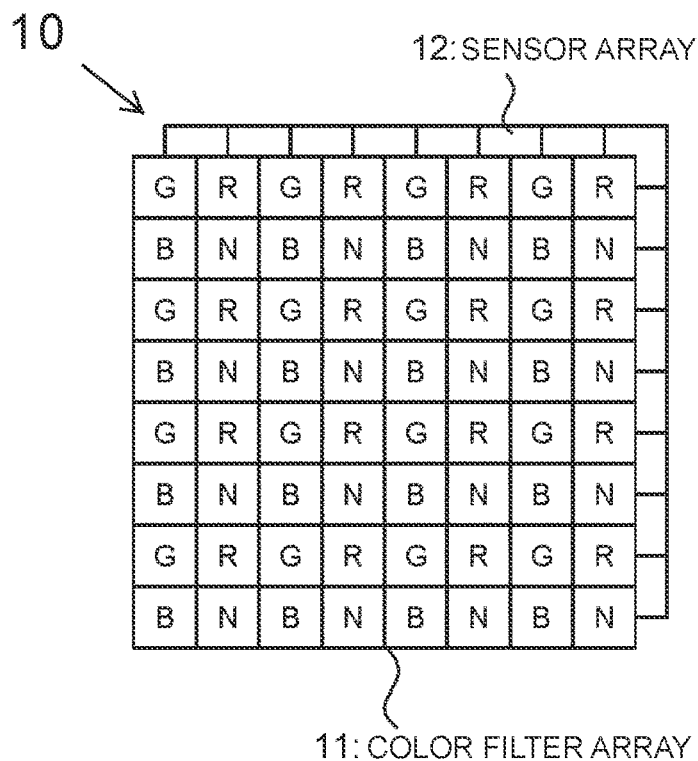
FIG. 2 is a conceptual diagram showing a configuration example of an image sensor according to the embodiment of the present disclosure.

FIG. 2 is a conceptual diagram showing a configuration example of the image sensor 10. The image sensor 10 includes a color filter array (CFA) 11 and a sensor array 12. The light that enters the image sensor 10 enters the sensor array 12 through the color filter array 11.

The color filter array 11 includes a plurality of color filters arranged in an array. The color filters are composed of a plurality of types of color filters through which light in different wavelength bands passes. For example, in FIG. 2, "R" is a color filter through which red light passes, "G" is a color filter through which green light passes, "B" is a color filter through which blue light passes, and "N" is a color filter through which near infrared light passes. Red light, green light, and blue light are visible light, and near infrared light is invisible light.

The sensor array 12 receives light that has passed through the color filter array 11. The sensor array 12 includes a plurality of sensors (cells) arranged in an array. The color filters and the sensors are associated with each other on a one-to-one basis. Each sensor includes a photodiode and generates an electric charge according to the amount of light that has passed through the corresponding color filter. The received light data (mosaic data) includes the amount of electric charge generated by each of the sensors.

The processor 20 acquires the first received light data RAW_IR and the second received light data RAW_VI from the image sensor 10. Then, the processor 20 performs the "development processing" to generate an image from the acquired received light data.

More specifically, the processor 20 includes a demosaicing unit 21. The demosaicing unit 21 can generate an invisible light image IMG_IR by performing demosaicing for the first received light data RAW_IR. Demosaicing performed for the first received light data RAW_IR corresponding to invisible light is hereinafter referred to as "first demosaicing." Similarly, the demosaicing unit 21 can generate a visible light image IMG_VI by performing demosaicing for the second received light data RAW_VI. Demosaicing performed for the second received light data RAW_VI corresponding to visible light is hereinafter referred to as "second demosaicing."

The processor 20 may further include an image compression unit 22 that performs image compression. The image compression unit 22 compresses the invisible light image IMG_IR and the visible light image IMG_VI. The compression format is not particularly limited.

The storage device 30 stores the invisible light image IMG_IR and the visible light image IMG_VI generated by the processor 20. Examples of the storage device 30 include a non-volatile memory, a hard disk drive (HDD), and a solid-state drive (SSD).

In this way, the image generation device 1 can simultaneously generate both the visible light image IMG_VI and the invisible light image IMG_IR. The visible light image IMG_VI is suitable from the viewpoint of color reproducibility. On the other hand, the invisible light image IMG_IR has an advantage that it can be obtained well even in a dark environment (for example, nighttime and tunnel) where the amount of visible light is small.

However, generating both the visible light image IMG_VI and the invisible light image IMG_IR means an increase in the amount of demosaicing since both images are generated. Performing demosaicing more than necessary and generating images more than necessary lead to a waste of computational resources and storage resources and to an increase in the processing time. These disadvantages are not particularly suitable for the control, such as vehicle control, that requires real-time performance.

To solve this problem, the image generation device 1 according to this embodiment is configured to be able to flexibly generate the visible light image IMG_VI and the invisible light image IMG_IR according to the situation. In particular, the image generation device 1 is configured to be able to flexibly generate the visible light image IMG_VI and the invisible light image IMG_IR according to the illuminance of the surrounding environment.

The image generation processing based on the illuminance in this embodiment will be described below in detail.

2. Image Generation Processing Based on Illuminance

An illuminance information acquisition device 40 shown in FIG. 1 acquires the illuminance information ILUM indicating the illuminance of the surrounding environment of the image sensor 10 (the image generation device 1). That is, the illuminance information acquisition device 40 measures, calculates, or estimates the illuminance of the surrounding environment of the image sensor 10. For example, the illuminance information acquisition device 40 is an illuminance sensor that measures the illuminance. As another example, the illuminance information acquisition device 40 may include a Lidar (LIDAR: Laser Imaging Detection and Ranging), in which case the illuminance is estimated from the rider reflectance. The illuminance information acquisition device 40 outputs the illuminance information ILUM to the processor 20. Note that the illuminance information acquisition device 40 may be included in the image generation device 1 or may be provided separately from the image generation device 1.

The processor 20 further includes a demosaicing method determination unit 23. The demosaicing method determination unit 23 acquires the illuminance information ILUM from the illuminance information acquisition device 40. Then, based on the illuminance indicated by the illuminance information ILUM, the demosaicing method determination unit 23 determines the content of demosaicing to be performed by the demosaicing unit 21. The demosaicing unit 21 performs necessary demosaicing according to the determination by the demosaicing method determination unit 23.

Various examples of illuminance-based demosaicing according to this embodiment performed will be described below.

2-1. First Example

In a dark environment where the amount of visible light is small (low illuminance environment), the brightness and the quality of the visible light image IMG_VI are low. On the other hand, the invisible light image IMG_IR can be obtained with high sensitivity and with high brightness even in a dark environment. Therefore, in a dark environment, the invisible light image IMG_IR is useful, while the visible light image IMG_VI is relatively less useful. In such a dark environment, even if the visible light image IMG_VI is not generated, it is considered that the processing accuracy of the subsequent stages is not affected so much. In other words, it is not always necessary to generate both the visible light image IMG_VI and the invisible light image IMG_IR but, instead, it is considered that the invisible light image IMG_IR alone is sufficient for the subsequent processing. From this point of view, the invisible light image IMG_IR is prioritized in the dark environment.

Figure 3:
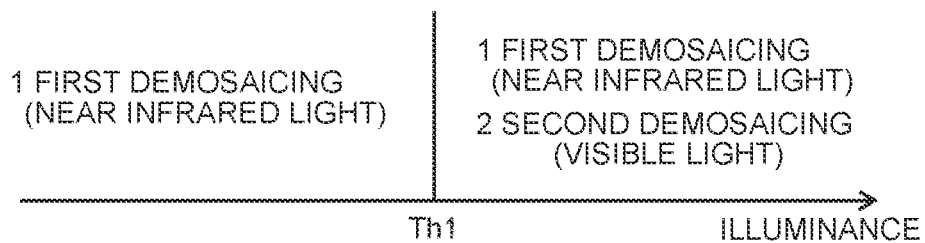
FIG. 3 is a conceptual diagram showing a first example of demosaicing according to the embodiment of the present disclosure.

FIG. 3 is a conceptual diagram showing a first example of demosaicing according to this embodiment. When the illuminance is less than the first threshold value Th1, the processor 20 performs the first demosaicing for the first received light data RAW_IR, but does not perform the second demosaicing for the second received light data RAW_VI. That is, the processor 20 generates only the invisible light image IMG_IR without generating the visible light image IMG_VI. This generation method prevents demosaicing from being performed more than necessary at least when the illuminance is less than the first threshold value Th1. As a result, the waste of computational resources and storage resources is prevented and, at the same time, the processing time is reduced.

In the first example, when the illuminance is equal to or greater than the first threshold value Th1, the processor 20 performs the first demosaicing and the second demosaicing to generate both the invisible light image IMG_IR and the visible light image IMG_VI.

2-2. Second Example

In a bright environment (high illuminance environment), a good visible light image IMG_VI is generated. Furthermore, from the viewpoint of color reproducibility, the visible light image IMG_VI is superior to the invisible light image IMG_IR. Therefore, in a bright environment, the visible light image IMG_VI is useful, while the invisible light image IMG_IR is relatively less useful. In such a bright environment, even if the invisible light image IMG_IR is not generated, it is considered that the processing accuracy of the subsequent stages is not affected so much. In other words, it is not always necessary to generate both the visible light image IMG_VI and the invisible light image IMG_IR but, instead, it is considered that the visible light image IMG_VI alone is sufficient for the subsequent processing.

From this point of view, the visible light image IMG_VI is prioritized in the bright environment.

Figure 4:
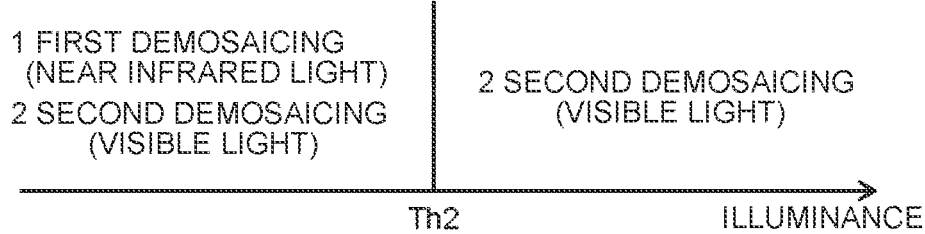
FIG. 4 is a conceptual diagram showing a second example of demosaicing according to the embodiment of the present disclosure.

FIG. 4 is a conceptual diagram showing a second example of demosaicing according to this embodiment. When illuminance is equal to or greater than the second threshold value Th2, the processor 20 performs the second demosaicing for the second received light data RAW_VI, but does not perform the first demosaicing for the first received light data RAW_IR. That is, the processor 20 generates only the visible light image IMG_VI without generating the invisible light image IMG_IR. This generation method prevents demosaicing from being performed more than necessary at least when illuminance is equal to or greater than the second threshold value Th2. As a result, the waste of computational resources and storage resources is prevented and, at the same time, the processing time is reduced.

In the second example, when the illuminance is less than the second threshold value Th2, the processor 20 performs the first demosaicing and the second demosaicing to generate both the invisible light image IMG_IR and the visible light image IMG_VI.

2-3. Third Example

Figure 5:
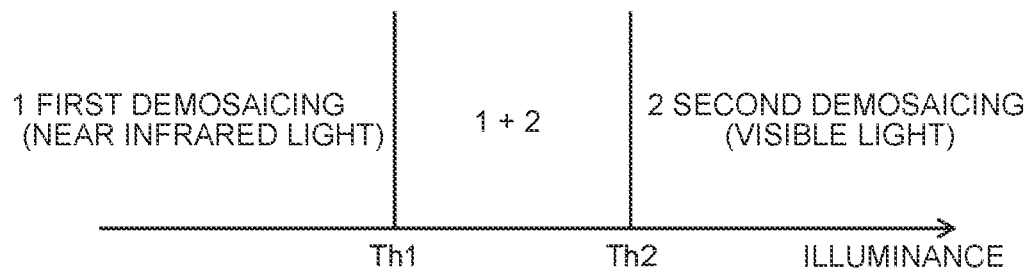
FIG. 5 is a conceptual diagram showing a third example of demosaicing according to the embodiment of the present disclosure.

FIG. 5 is a conceptual diagram showing a third example of demosaicing according to this embodiment. The third example is a combination of the first example and the second example described above.

When the illuminance is less than the first threshold value Th1, the processor 20 performs only the first demosaicing without performing the second demosaicing and, therefore, generates only the invisible light image IMG_IR without generating the visible light image IMG_VI. On the other hand, when the illuminance is equal to or greater than the second threshold value Th2, the processor 20 performs only the second demosaicing without performing the first demosaicing and, therefore, generates only the visible light image IMG_VI without generating the invisible light image IMG_IR. Note here that the second threshold value Th2 is greater than the first threshold value Th1. This generation method achieves the effect of both the first example and the second example described above.

In the third example, when the illuminance is equal to or greater than the first threshold value Th1 and less than the second threshold value Th2, the processor 20 performs the first demosaicing and the second demosaicing to generate both the invisible light images IMG_IR and the visible light image IMG_VI.

2-4. Fourth Example

Figure 6:
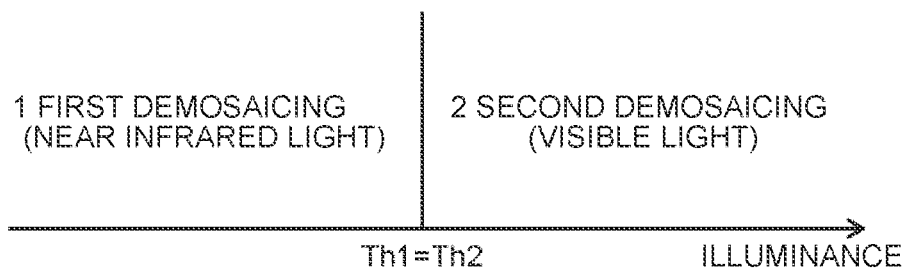
FIG. 6 is a conceptual diagram showing a fourth example of demosaicing according to the embodiment of the present disclosure.

FIG. 6 is a conceptual diagram showing a fourth example of demosaicing according to this embodiment. The fourth example is a modification of the third example described above. More specifically, the first threshold value Th1 and the second threshold value Th2 are equal. In this case, the processor 20 performs processing by switching between the first demosaicing and the second demosaicing according to the illuminance.

2-5. Processing Flow

Figure 7:
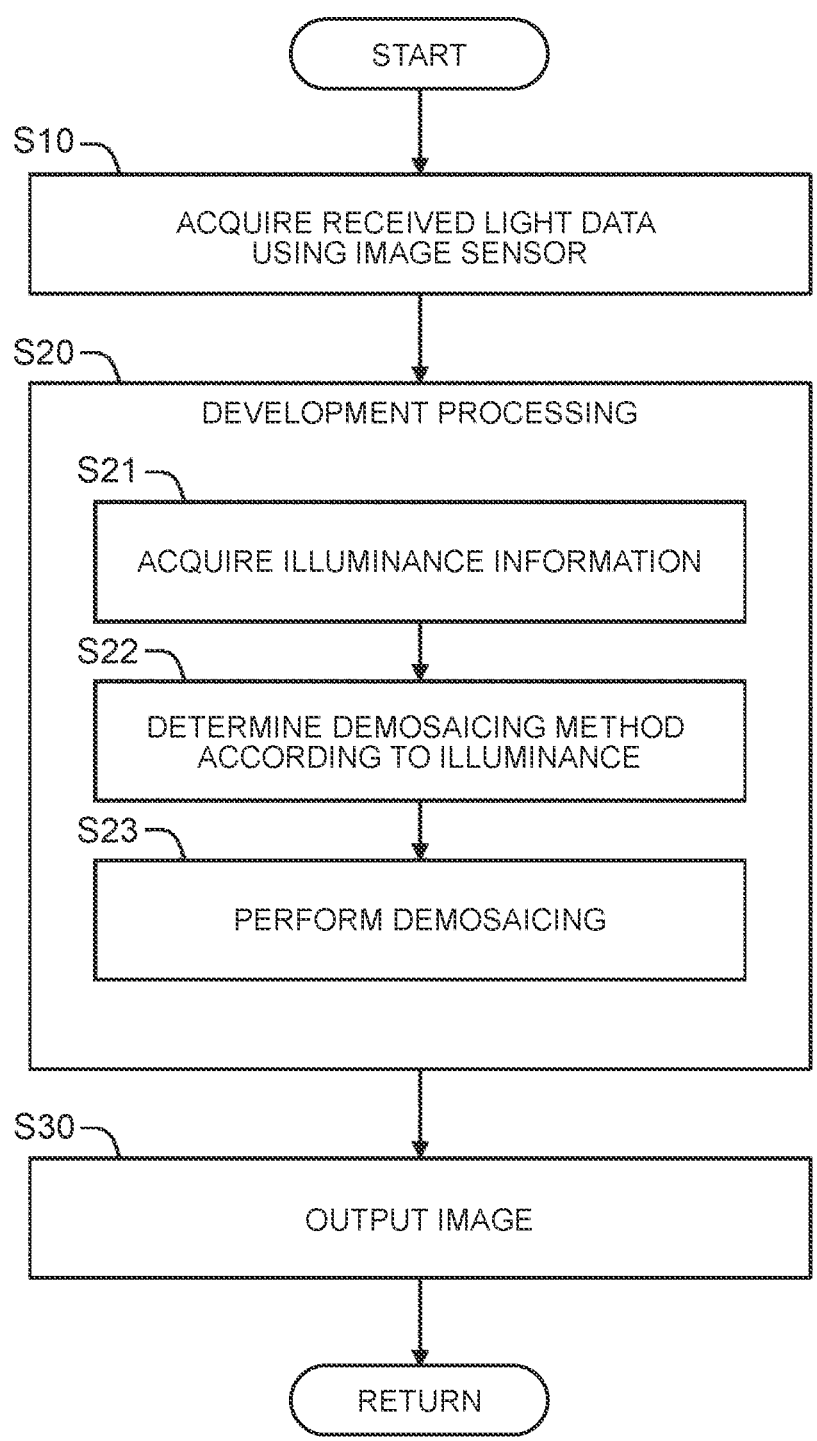
FIG. 7 is a flowchart showing an image generation method according to the embodiment of the present disclosure.

FIG. 7 is a flowchart schematically showing an image generation method according to this embodiment.

In step S10, the image generation device 1 acquires the first received light data RAW_IR and the second received light data RAW_VI using the image sensor 10.

In step S20, the image generation device 1 performs the development processing to generate an image from the acquired received light data. More specifically, in step S21, the image generation device 1 acquires the illuminance information ILUM indicating the illuminance of the surrounding environment of the image sensor 10 (the image generation device 1). In step S22, the image generation device 1 determines the demosaicing method according to the illuminance (see FIG. 3 to FIG. 6). Then, in step S23, the image generation device 1 performs demosaicing according to the method, determined in step S22, to generate a necessary image.

In step S30, the image generation device 1 stores the generated image in the storage device 30. In addition, the image generation device 1 outputs the generated image to the outside.

2-6. Effect

According to this embodiment, the first demosaicing and/or the second demosaicing that are necessary are performed in consideration of the illuminance of the surrounding environment of the image sensor 10 as described above. That is, the visible light image IMG_VI and the invisible light image IMG_IR can be flexibly generated according to the situation without performing demosaicing more than necessary. As a result, the waste of computational resources and storage resources is prevented and, therefore, the computational resources and the storage resources are used efficiently. In addition, the processing time as a whole is reduced. An efficient use of computational resources and storage resources and a reduction in the processing time are particularly suitable in the control that requires real-time performance such as vehicle control.

3. Vehicle Control System

The image generation device 1 according to this embodiment is applied, for example, to vehicle control (example: autonomous driving control, remote control). The following describes an example in which the image generation device 1 according to this embodiment is applied to vehicle control.

Figure 8:
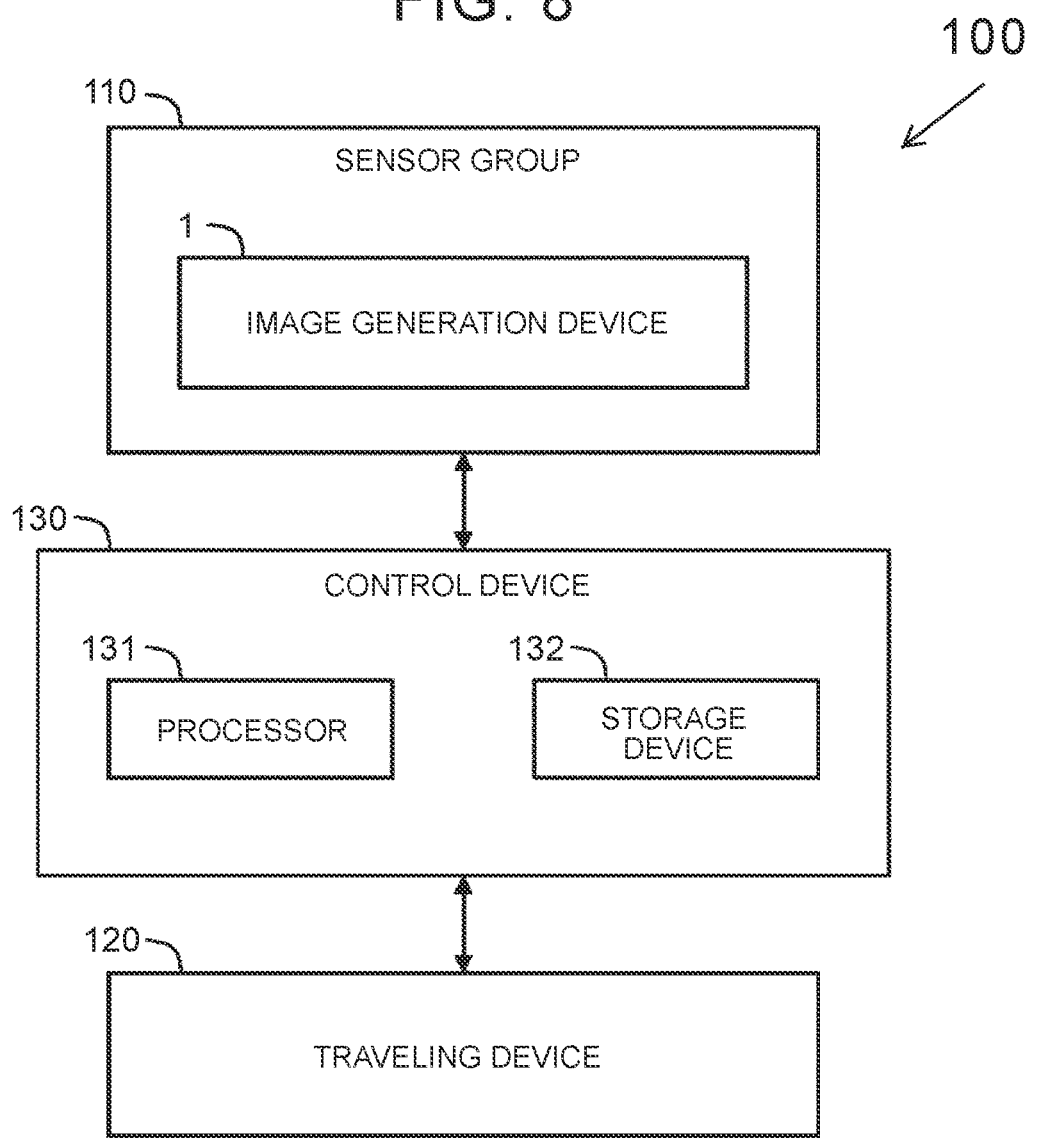
FIG. 8 is a block diagram showing a configuration example of a vehicle control system according to the embodiment of the present disclosure.

FIG. 8 is a block diagram showing a configuration example of a vehicle control system 100 according to this embodiment. The vehicle control system 100 includes a sensor group 110, a traveling device 120, and a control device 130.

The sensor group 110 is mounted on a vehicle. The sensor group 110 includes a recognition sensor that recognizes the surroundings of the vehicle. The recognition sensor includes the image generation device 1 (camera) according to this embodiment. The image generation device 1 photographs the surroundings of the vehicle and generates an image (invisible light image IMG_IR, visible light image IMG_VI) showing the surroundings. The recognition sensor may further include a LIDAR or a millimeter wave radar. In addition, the recognition sensor may include an illuminance sensor that detects the illuminance of the surrounding environment of the vehicle.

The sensor group 110 also includes a vehicle state sensor that detects the state of the vehicle. The vehicle state sensor includes sensors such as a speed sensor, an acceleration sensor, a yaw rate sensor, and a steering angle sensor. In addition, the sensor group 110 includes a position sensor that detects the position and the orientation of the vehicle. Examples of the position sensor include a Global Positioning System (GPS) sensor.

The traveling device 120 is mounted on the vehicle. The traveling device 120 includes a steering device, a drive device, and a braking device. The steering device steers the wheels. For example, the steering device includes an electric power steering (EPS) device. The drive device is a power source that generates driving force. Examples of the drive device include an engine, an electric motor, and an in-wheel motor. The braking device generates braking force.

The control device 130 controls the vehicle. The control device 130 includes one or more processors 131 (hereinafter, simply referred to as processor 131) and one or more storage devices 132 (hereinafter, simply referred to as storage device 132). The processor 131 performs various types of processing. For example, the processor 131 includes a central processing unit (CPU). The storage device 132 stores various types of information necessary for the processor 131 to perform processing. Examples of the storage device 132 include a volatile memory, a non-volatile memory, an HDD, and an SSD. The control device 130 may include one or more electronic control units (ECU). A part of the control device 130 may be an information processing device outside the vehicle. In that case, the part of the control device 130 communicates with the vehicle to remotely control the vehicle.

The processor 131 performs vehicle traveling control for controlling the traveling of the vehicle. The vehicle traveling control includes steering control, acceleration control, and deceleration control. The processor 131 performs vehicle traveling control by controlling the traveling device 120 (steering device, drive device, braking device).

The processor 131 may perform autonomous driving control. More specifically, the processor 131 uses the recognition sensor to recognize (detect) an object around the vehicle. When recognizing an object, an image generated by the image generation device 1 is used. According to this embodiment, the invisible light image IMG_IR and/or the visible light image IMG_VI that are suitable for the surrounding environment (scene) are generated. Therefore, object recognition is performed accurately. Based on the result of object recognition, the processor 131 generates a travel plan and a target trajectory for the vehicle. Then, the processor 131 performs vehicle traveling control so that the vehicle follows the target trajectory.

An image generated by the image generation device 1 may be used for the remote support or the remote driving of the vehicle. In that case, the control device 130 communicates with a remote support device (not shown) and sends the image to the remote support device. The remote support device displays the received image on the display device. A remote operator looks at the displayed image and performs remote instruction or remote control. The remote support device sends the information on the remote instruction or the remote control, performed by the remote operator, to the vehicle. The control device 130 performs vehicle travelling control according to the received remote instruction or remote control.

As described above, an image generated by the image generation device 1 can be used for vehicle control. According to this embodiment, the invisible light image IMG_IR and/or the visible light image IMG_VI that are suitable for the surrounding environment (scene) are generated. That is, it is possible to secure the accuracy of vehicle control while reducing unnecessary demosaicing.

What is claimed is:

1. An image generation device that generates an image, the image generation device comprising one or more processors, wherein
    each of the one or more processors is configured to
        acquire first received light data and second received light data from an image sensor, the image sensor receiving invisible light and visible light separately through a filter, the first received light data indicating a received light result of the invisible light, the second received light data indicating a received light result of the visible light and
        generate the image by performing demosaicing for at least one of the first received light data and the second received light data based on illuminance information, the illuminance information indicating an illuminance of a surrounding environment of the image sensor, and wherein
    when the illuminance is less than a first threshold value, each of the one or more processors is configured to generate an invisible light image as the image by performing first demosaicing for the first received light data without performing second demosaicing for the second received light data.

2. The image generation device according to claim 1, wherein:
    a second threshold value is equal to or greater than the first threshold value; and
    when the illuminance is equal to or greater than the second threshold value, each of the one or more processors is configured to generate a visible light image as the image by performing the second demosaicing for the second received light data without performing the first demosaicing for the first received light data.

3. The image generation device according to claim 2, wherein the first threshold value and the second threshold value are equal.

4. The image generation device according to claim 2, wherein:
    the second threshold value is greater than the first threshold value; and
    when the illuminance is equal to or greater than the first threshold value and is less than the second threshold value, each of the one or more processors is configured to generate both the invisible light image and the visible light image by performing the first demosaicing and the second demosaicing.

5. The image generation device according to claim 1, wherein the invisible light is a near infrared light.

6. A vehicle control system comprising:
    the image generation device according to claim 1; and
    a control device configured to control a vehicle based on the image.

7. An image generation device that generates an image, the image generation device comprising one or more processors, wherein
    each of the one or more processors is configured to
        acquire first received light data and second received light data from an image sensor, the image sensor receiving invisible light and visible light separately through a filter, the first received light data indicating a received light result of the invisible light, the second received light data indicating a received light result of the visible light and
        generate the image by performing demosaicing for at least one of the first received light data and the second received light data based on illuminance information, the illuminance information indicating an illuminance of a surrounding environment of the image sensor, and wherein when the illuminance is equal to or greater than a threshold value, each of the one or more processors is configured to generate a visible light image as the image by performing second demosaicing for the second received light data without performing first demosaicing for the first received light data.

8. The image generation device according to claim 7, wherein the invisible light is a near infrared light.

9. A vehicle control system comprising:
the image generation device according to claim 7; and
a control device configured to control a vehicle based on the image.

10. An image generation method comprising:
acquiring processing for acquiring first received light data and second received light data using an image sensor, the image sensor receiving invisible light and visible light separately through a filter, the first received light data indicating a received light result of the invisible light, the second received light data indicating a received light result of the visible light; and
development processing for generating an image by performing demosaicing for at least one of the first received light data and the second received light data based on illuminance information, the illuminance information indicating an illuminance of a surrounding environment of the image sensor, wherein
when the illuminance is less than a first threshold value, the development processing includes processing for generating an invisible light image as the image by performing first mosaicking for the first received light data without performing second demosaicing for the second received light data.

* * * * *